United States Patent [19]

Uri

[11] Patent Number: 4,852,522

[45] Date of Patent: Aug. 1, 1989

[54] SUSPENSION-TYPE WATER SUPPLY SYSTEM FOR POULTRY

[75] Inventor: Ehud Uri, Menashe, Israel

[73] Assignee: Plasson Maagan Michael Industries Ltd., Enashe, Israel

[21] Appl. No.: 123,737

[22] Filed: Nov. 23, 1987

[30] Foreign Application Priority Data

Apr. 17, 1987 [IL] Israel ............................................... 82252

[51] Int. Cl.⁴ ................................................ A01K 7/00
[52] U.S. Cl. ................................................ 119/72
[58] Field of Search ............... 119/72, 72.5, 74, 52 B, 119/52 AF; 285/197, 198, 199; 248/49, 58, 74.4; 24/459

[56] References Cited

U.S. PATENT DOCUMENTS

| | | | |
|---|---|---|---|
| 607,517 | 7/1898 | Meserve | 285/197 |
| 1,049,085 | 12/1912 | Healy et al. | 248/58 |
| 2,549,346 | 4/1951 | Tormo | 248/58 |
| 2,574,309 | 11/1951 | Wood | 248/58 |
| 3,330,517 | 7/1967 | Zimmermann | 248/74.4 X |
| 3,455,527 | 7/1969 | Suozzo | 248/74.4 X |
| 3,462,804 | 8/1969 | Renaudin | 248/74.4 |
| 3,602,197 | 8/1971 | Fioretto | 119/72.5 |
| 3,664,305 | 5/1972 | Hart et al. | 119/72 |
| 3,724,425 | 4/1973 | Thompson | 119/72 |
| 4,516,533 | 5/1985 | Mallinson | 119/72 |

FOREIGN PATENT DOCUMENTS

| | | | |
|---|---|---|---|
| 812712 | 11/1937 | France | 24/263 |
| 711769 | 7/1966 | Italy | 285/197 |
| 67997 | 6/1944 | Norway | 248/58 |

*Primary Examiner*—Gene Mancene
*Assistant Examiner*—R. Thomas Price
*Attorney, Agent, or Firm*—Benjamin J. Barish

[57] ABSTRACT

A suspension-type water supply system for poultry includes a plurality of rigid, elongated suspension members each formed at one side with a longitudinally-extending socket section receiving a water supply pipe for supplying water to poultry drinking devices suspended therefrom, and formed at its opposite side with a continuous, longitudinally-extending flange section for increasing the resistance of the water supply system to sagging; and a plurality of bridging members each bridging the ends of two adjacent suspension members and securing them together by fasteners passing through the bridging members and the ends of the suspension members. The flange section flange section of each of the suspension members is formed with a pair of longitudinally-extending ribs on its opposite faces. The system further includes a plurality of hangers slidably receiving the ribs for supporting the water supply system in suspension at any desired points thereof.

6 Claims, 2 Drawing Sheets

SUSPENSION-TYPE WATER SUPPLY SYSTEM FOR POULTRY

BACKGROUND OF THE INVENTION

The present invention relates to water supply systems for poultry, and particularly to the suspension-type systems in which a plurality of poultry drinking devices are supported in suspension over the ground occupied by the poultry.

A number of suspension-type water supply systems for poultry have been developed, as illustrated for example in U.S. Pat. Nos. 3,661,122, 3,664,305, 4,157,697, 4,185,590, 4,221,188, 4,267,800, 4,341,182 and 4,516,533. The latter patent describes a rigid, elongated suspension member formed at one side with a longitudinally-extending socket section receiving a water supply pipe for supply water to poultry drinking devices suspended therefrom, and formed at its opposite side with a continuous, longitudinally-extending flange section for increasing the resistance of the water supply system to sagging when suspended. The present invention is particularly related to the latter type water supply system, and provides a number of novel features as will be described more particularly below.

BRIEF SUMMARY OF THE INVENTION

According to one feature of the present invention, there is provided a water supply system of the suspension-type described in U.S. Pat. No. 4,516,533, characterized in that the flange section of the suspension member is formed with a pair of longitudinally-extending ribs on its opposite faces, and in that the system further includes a plurality of hangers slidably receiving the ribs for supporting the water supply system in suspension at any desired points thereof.

Such an arrangement does not require that the suspension of the system be at any specific points, thereby simplifying the original installation as well as the continuous maintenance and repair of the system. In addition, the novel arrangement obviates the need for making holes through the suspension member, which not only simplifies the original installation of the system, but also strengthens the suspension member against sagging. Still further, the provision of the longitudinally-extending ribs also significantly strengthens the suspension member against sagging.

According to another feature of the present invention, the system includes a plurality of the elongated suspension members, and also a plurality of bridging members each bridging the ends of two adjacent suspension members and securing them together by fasteners passing through the bridging members and the ends of the suspension members. Such an arrangment also facilitates the original installation, maintenance and repair of the system, and further strengthens it against sagging.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
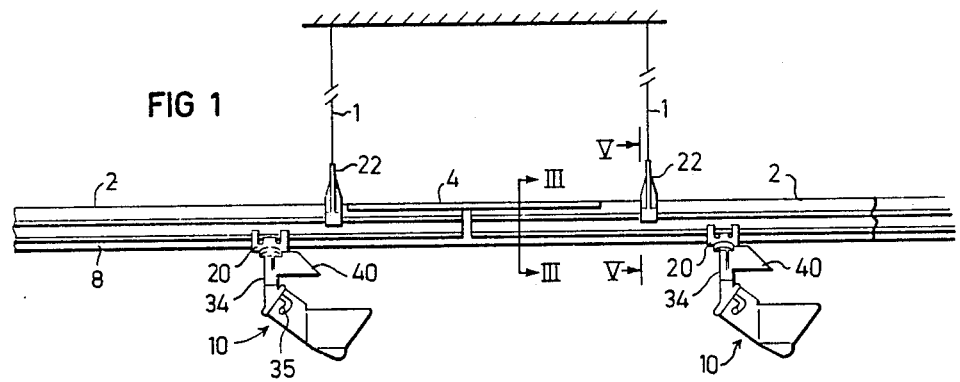
FIG. 1 is a side elevational view illustrating one form of water supply system constructed in accordance with the present invention.
Figure 2:
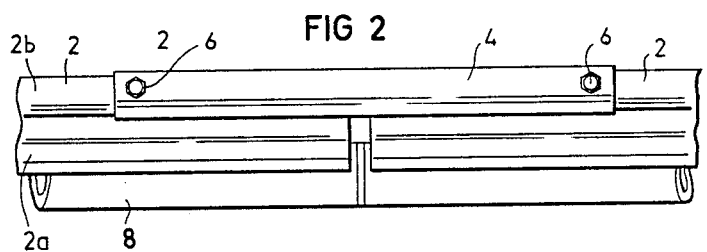
FIG. 2 is an enlarged fragmentary view of a part of the system of FIG. 1.

The water supply system illustrated in the drawings is of the suspension-type and is adapted to be suspended by a plurality of wires or cables 1 from the ceiling of an enclosure, or from any other location where poultry are bred. As known, the vertical height of the system above the ground is changed, by means of the cables 1, according to the growth of the poultry to be watered by the system.

The system comprises a plurality of rigid, elongated, suspension members 2 bridged by a plurality of bridging members 4. While FIG. 1 illustrates only two suspension members 2 and a single bridging member 4, it will be appreciated that there would be a larger number of both such members, each bridging member bridging, and securing together, the ends of two adjacent suspension members 2 by means of fasteners 6, as shown in FIG. 3.

Each suspension member 2 is integrally formed with a continuous, longitudinally-extending socket section 2a at its lower side in the suspended condition extending flange section 2b at its upper side. Socket section 2a is of semi-cylindrical configuration for receiving a water supply pipe 8 which supplies water to the poultry drinking devices, generally designated 10, suspended from the water supply pipe and the suspension members 2. Flange section 2b increases the resistance of the suspended water supply system to sagging, and also prevents the poultry from perching on top of the suspension members.

Suspension members 2 and bridging members 4 are preferably made of continuous extrusions, such as of aluminum, and cut to the desired lengths.

Figure 3:
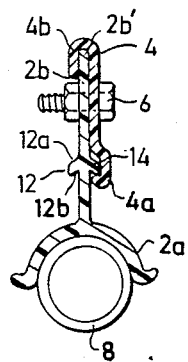
FIG. 3 is an enlarged sectional view along lines III—III of FIG. 1.
Figure 4:
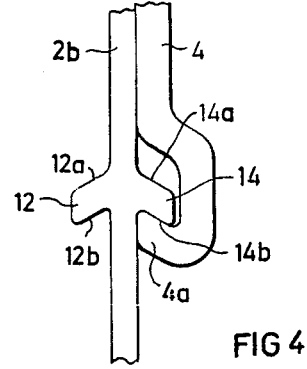
FIG. 4 is an enlarged fragmentary view illustrating a detail of FIG. 3.
Figure 5:
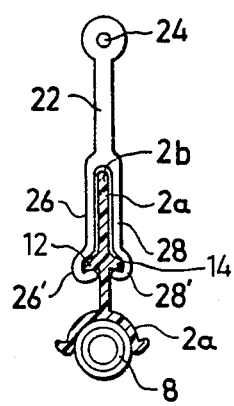
FIG. 5 is an enlarged sectional view along lines V—V of FIG. 1.

As shown particularly in FIGS. 3–5, the suspension flange section 2b of the members 2 are formed with longitudinally-extending ribs 12, 14 at its opposite sides spaced inwardly from its outer free edge. The opposite faces 12a, 12b, 14a, 14b of each rib are slanted downwardly so that the underfaces 12b, 14b (FIG. 4) define sockets adapted to receive a hook-shaped edge 4a of the bridging member 4. The upper edge of bridging member 4 is inturned, as shown at 4b, to overlie the outer free edge 2b' of the flange section 2b of each suspension member 2.

Figure 6:
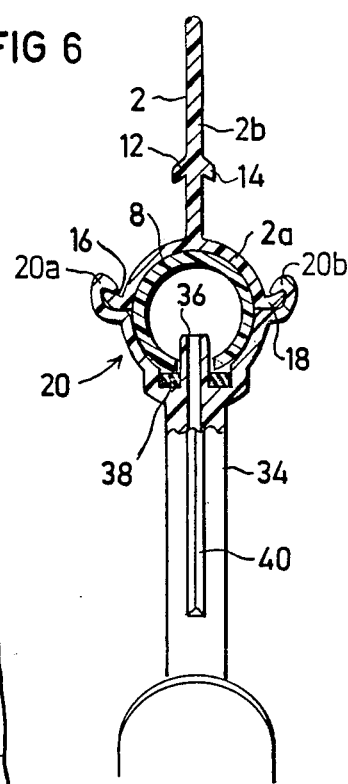
FIG. 6 is an enlarged view, partly in section, more particularly showing the mounting of one of the drinking cups to the water supply system.

The outer edges of the socket section 2a of each suspension member 2 are turned outwardly, as shown at 16, 18 in FIG. 6. These outturned edges 16, 18 are engaged by saddle clamps 20 which support the poultry drinking devices 10, and which at the same time clamp the water supply pipe 8 to the socket sections 2a of the suspension members 2. For this purpose, the saddle clamps 20 include inturned edges 20a, 20b engageable with the outturned edges 16, 18 of the socket section 2a.

The suspension members 2 are supported from the ceiling or other supporting device by the previously mentioned cables 1 via a plurality of hangers 22. As shown particularly in FIG. 5, each hanger 22 is formed at one end with an opening 24 for attachment to one, of the cables 1, and with a pair of closely-spaced legs 26, 28 at the opposite end. Each leg terminates in an inturned tip 26', 28' slidably engageable with the slanted underfaces 12b, 14b of the ribs 12, 14 formed in the suspension members 2. Thus, the water supply system may be conveniently suspended from any desired points by merely sliding hangers 22 along ribs 12, 14 of the suspension members 2.

Figure 7:
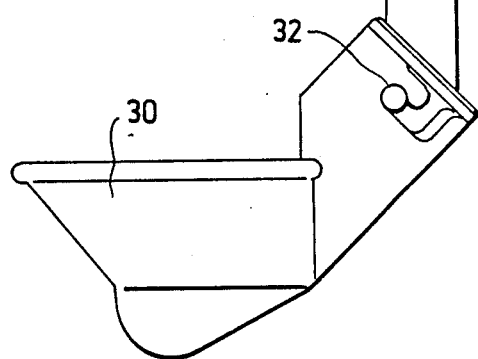
FIG. 7 is an end view illustrating one of the cup drinking devices attached to the water supply system of FIG. 1.
Figure 7:
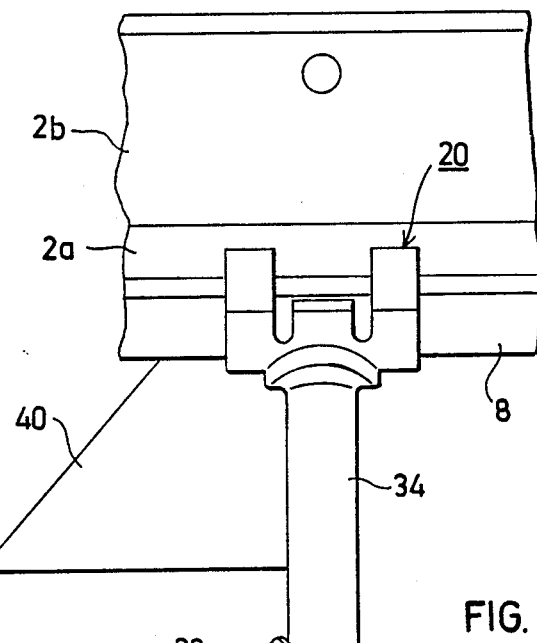

One of the poultry drinking devices 10 illustrated in FIG. 1 is more clearly seen in FIG. 7. These devices are of the cup-type including a cup 30 quickly-attachable by a bayonet pin and socket connection 32 to a hollow stem 34. The previously-mentioned saddle-type connector 20 is integrally formed with the upper end of stem 34, which stem is also integrally formed with a nipple 36 (FIG. 6) penetrating into the interior of the water supply pipe 8. Stem 34 further includes a sealing ring 38 around nipple 36.

Stem 34 further includes a triangular flag-shaped member 40 secured to overlie the cup 30, which member prevents the poultry from stepping into the cup. Stem 34 further includes a valve assembly for controlling the feeding of the water from the water supply pipe 8 to the interior of the cup 30, and an operator (not shown) engageable by the poultry when drinking from the cup to control the supply of water to the cup so as to maintain a relatively constant level of water within each cup. The foregoing elements of the cup are well known and are therefore not illustrated nor further described herein.

The illustrated water supply system may be assembled and used in the following manner. First, predetermined lengths of the suspension members 2 are assembled together by bridging members 4. The water supply pipe 8 is then inserted into the socket section 2a of the suspension members 2, and a plurality of the drinking devices 10 are then applied to the suspension members 2 and to the water supply pipe 8.

Each cup device 10 is applied by inserting its nipple 36 through an opening formed in the water supply pipe 8, and snapping the inturned edges 20a, 20b of its saddle clamp 20 over the outturned edges 16, 18 of the socket sections 2a of the suspension members. In this manner, each of the saddle clamps 20 performs a number of functions: it secures the pipe 8 to the socket sections 2a of the suspension members 2; it also secures the cup devices to the pipe 8; it establishes water communication via nipple 36 from the water supply pipe to the cup device; and it seals, via seal 38, the connection of the water cup to the water supply pipe.

After the system has been assembled as described above, it then may be suspended at any desired points by merely applying hangers 22 over the suspension members 2, sliding them along ribs 12, 14, and suspending the hangers via cables 1 from the ceiling or other support.

While the invention has been described with respect to one preferred embodiment, it will be appreciated that many variations, modifications and other applications of the invention may be made.

What is claimed is:

1. A suspension-type water supply system for poultry including a plurality of rigid, elongated suspension members each formed at one side with a longitudinally-extending socket section receiving a water supply pipe for supplying water to poultry drinking devices suspended therefrom, and at its opposite side with a continuous, longitudinally-extending flange section for increasing the resistance of the water supply system to a plurality of bridging members each bridging ends of the flange sections of two adjacent suspension members and securing them together by fasteners passing through the bridging members and the flange sections of the suspension members; said flange section of each of the suspension members having an outer edge and a pair of longitudinally-extending ribs on its opposite faces spaced inwardly from its outer edge; and a plurality of hangers slidably receiving said ribs for supporting the water supply system in suspension at any desired points thereof.

2. The system according to claim 1, wherein each of said hangers comprises a pair of closely spaced legs each formed with an inturned tip for slidably engaging the underfaces of the pair of ribs of said flange sections in the suspended conditions of the suspension members.

3. The system according to claim 1, wherein each bridging member is formed at one side with an inturned end to overlie the outer edge of the flange section, and at the other side with another inturned end to engage the underside of one of the ribs of said flange section.

4. The system according to claim 1, wherein said poultry drinking devices are individual cups spaced along the length of the water supply pipe and attached thereto by saddle clamps which include inturned ends engageable with outturned ends formed at the opposite sides of said socket section of each suspension member, thereby also clamping said water supply pipe to the socket section of the suspension member.

5. The system according to claim 4, wherein each of said saddle clamps includes a hollow stem having a nipple of one end penetrating through a hole in the water supply pipe, the opposite end of the stem supporting a poultry drinking cup which is supplied with water from the water supply pipe via the hollow stem of the saddle clamp.

6. The system according to claim 5, wherein each of said saddle clamps further includes a sealing ring on its inner face enclosing said nipple.

* * * * *

UNITED STATES PATENT AND TRADEMARK OFFICE
CERTIFICATE OF CORRECTION

PATENT NO. : 4,852,522
DATED : August 1, 1989
INVENTOR(S) : Ehud Uri

It is certified that error appears in the above-identified patent and that said Letters Patent is hereby corrected as shown below:

Column 2, line 11, after "system" add -- of Fig. 1; and --

Column 2, line 38, after "condition" add -- of the member, and with a continuous, longitudinally- --

Column 2, line 51, before "suspension" add -- flange sections 2b of the --

Column 2, line 52, delete "flange section 2b of the"

Claim 1, Column 4, line 19, after "to" add -- sagging --

Claim 1, Column 4, line 20, after "bridging" (second occurance) add --the--.

Signed and Sealed this

Eighteenth Day of February, 1992

*Attest:*

HARRY F. MANBECK, JR.

*Attesting Officer*  *Commissioner of Patents and Trademarks*